United States Patent [19]
Harlon et al.

[11] Patent Number: 5,218,389
[45] Date of Patent: Jun. 8, 1993

[54] PORTABLE INTERACTIVE MULTIMEDIA PRESENTATION UNIT

[76] Inventors: Thomas A. Harlon, #16, Hightrail Way, Austin, Tex. 78738; Joseph F. Long, 1335 Lost Creek Blvd., Austin, Tex. 78746

[21] Appl. No.: 826,380
[22] Filed: Jan. 27, 1992
[51] Int. Cl.$^5$ ............... G03B 21/134; G03B 21/30
[52] U.S. Cl. ............................ 353/122; 353/97
[58] Field of Search ............... 353/122, 119, 97, 121; 358/231, 237, 255, 254

[56] References Cited

U.S. PATENT DOCUMENTS

| | | | |
|---|---|---|---|
| 3,820,885 | 6/1974 | Miller | 353/98 |
| 4,021,105 | 5/1977 | Schubach | 353/119 |
| 4,074,322 | 2/1978 | Cammilleri | 358/237 |
| 4,121,303 | 10/1978 | Reece | 353/97 |
| 4,171,883 | 10/1979 | Biancardi | 353/98 |
| 4,281,353 | 7/1981 | Scarborough, Jr. | 358/254 |
| 4,978,217 | 12/1990 | Tam | 353/119 |

Primary Examiner—William A. Cuchlinski, Jr.
Assistant Examiner—William C. Dowling
Attorney, Agent, or Firm—Joseph F. Long

[57] ABSTRACT

A portable interactive multimedia presentation unit comprising a portable computer and a portable carrying case equipped to hold a projector unit with mounting accessories and a conductive shroud to enclose a light path from the computer screen to the inlet of the projector unit.

6 Claims, 4 Drawing Sheets

PORTABLE INTERACTIVE MULTIMEDIA PRESENTATION UNIT

BACKGROUND OF THE INVENTION

Quite commonly presentations of material to groups for training, sales, and educational purposes are being made. Also, quite commonly computers are used to prepare and print out graphs, outlines, spread sheets or other material that may be used with a projector to project visual images for a group presentation. Also, quite commonly, programs are available that depict motion or animation on a computer screen and some computers are also equipped to give an audible output. A major objective of this invention is to provide a way that the image on a computer screen may be projected on a wall while the computer keyboard and mouse control are available for the operator to operate the computer in the normal way. Another objective of the invention is to provide a compact portable unit for projection of the computer screen image.

Another objective of the invention is to protect a computer user from electromagnetic waves emanating from the computer screen.

Another objective of the invention is to allow projection of the computer screen image in such a fashion that the computer user may make normal use of his computer looking at an on-the-wall projection of the image on the computer screen with the capability to enlarge the viewing area to be most comfortable for his use.

A preferred embodiment of the invention includes a portable computer and a carrying case with components to store an optical projection unit, a conductive shroud to enclose a light path from the computer screen to the entrance to the optical projection unit, and a mounting strip to hold and position the optical projection unit using extensible legs attachable to the mounting strip. Each pair of extensible legs fold into a base unit with a similar base unit hinged to each end of the carrying case.

In a second less portable embodiment, the extensible legs are attached to a weighted bar in order to hold the projection unit with shroud in a fixed position.

In both embodiments the projection unit is preferably made with a square cross section and in two parts. The lower part of the unit contains the optics to project the image on the computer screen in a vertical path to strike optics in the upper part of the unit. The optical system in the upper part of the projector is such that with the upper part fitted into the lower section an image may be projected in any one of four paths each at right angles to the other. Thus, a computer user may set the screen to be at right angles to the keyboard of the normal computer and project an enlarged image in front of the keyboard. In this way, the user should occasion less eyestrain and no exposure to electromagnetic radiation.

BRIEF SUMMARY OF THE INVENTION

A preferred embodiment of the invention comprises a shroud to enclose a light path from the face of a computer screen to a two part optical projection system and a carrying case type housing with compartments for storage of lens, the shroud, audio speakers, a mounting strip for both an upper and lower part of an optical projection system, extension cord, light bulb and miscellaneous accessories. The case also includes a pair of bases each hinged to the case and each containing a pair of hinged extensible legs with the upper end of each hinged leg attachable with a bolt and wing nut to the mounting strip.

To assemble the unit, the carrying case is positioned in back of a computer and the hinged bases are opened and positioned on either side of the computer. The extensible legs are then fastened to each end of the flat mounting strip. The mounting strip is flat and attachment points for the extensible legs are separated so that the extensible hinged legs may be adjusted to hold the mounting strip, which normally would be attached to the lower part of the projection unit, so that the lower part of projection unit would be in a nearly vertical position. The shroud to enclose the light path from the computer screen to the projection unit would then be installed by sliding the smaller end over a projection on the lower part of the optical projection system, pulling the larger end over the computer screen, and fastening both ends with a drawstring or Velcro TM to be essentially light tight. The base of the upper part of the optical projection system is oriented to project in the desired direction and is then slipped into the lower part of the optical projection system. The projection system is then connected to the electrical outlet and is ready for service.

In a second embodiment, the pair of hinged bases are hinged to a metal strip, preferably weighted, instead of the carrying case. This embodiment is meant to be used with a desk top computer.

DETAILED DESCRIPTION OF THE INVENTION

The invention may best be described from a description of the drawings.

Figure 1:
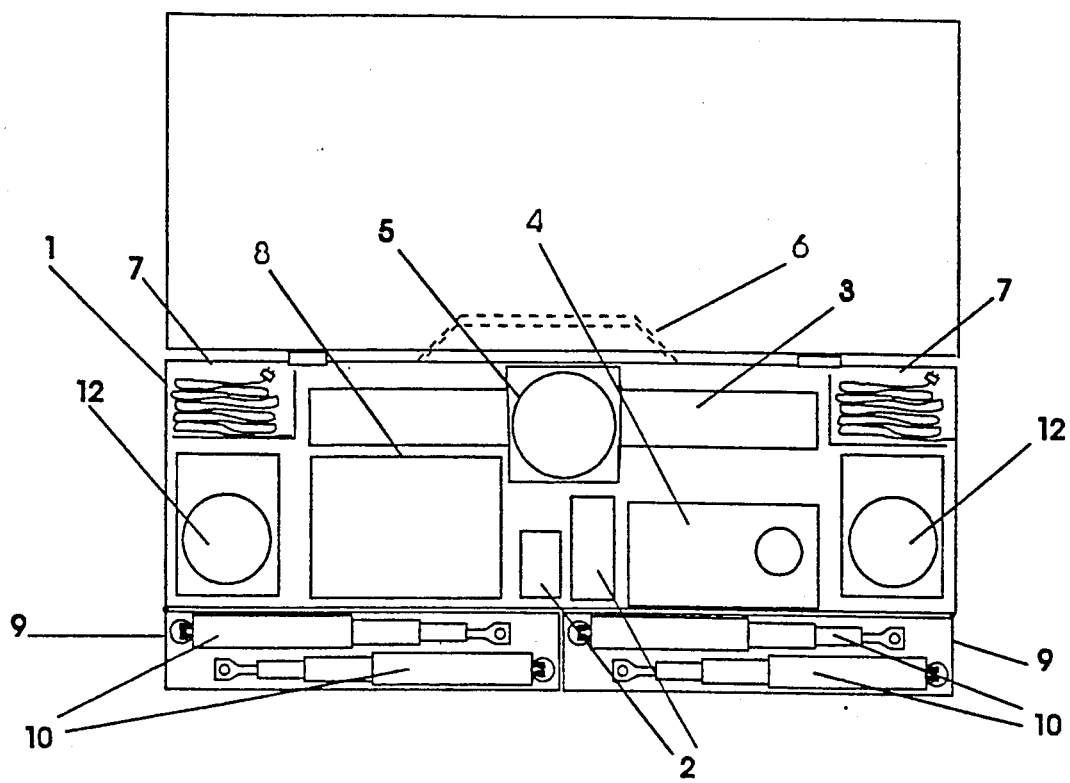
FIG. 1 shows a top view of the carrying case with elements of the unit identified.

In FIG. 1 we show a carrying case type housing 1 which in one preferred embodiment becomes part of the mounting assembly with hinged bases 9, containing extensible legs 10, being hinged to and held by the carrying case 1. Also shown in carrying case 1 are two different lens 2; these are used in the upper part of the optical projector system 4. One lens is for projection very close to the user while the other lens system is used for projection at some distance from the speaker such as a rear wall in a conference room. Also shown in the case, which is used also for storage and transportation, is mounting strip 3 with a lower section of the optical projection system 5 which is preferably detachably attached thereto. Speakers 12 may be either removable or hinged to case 1 and wired to allow rapid plug in for voice amplification from a computer. Compartments 7 are used for extension cords that may be used for the projector 4 and 5 and computer compartment 8 is provided for storage of miscellaneous accessories such as mouse for computer operation, laser beam pointer, etc. Shown in dotted lines is a carrying case handle 6 which in this view is under the hinged closure which is part of carrying case 1.

Figure 2:
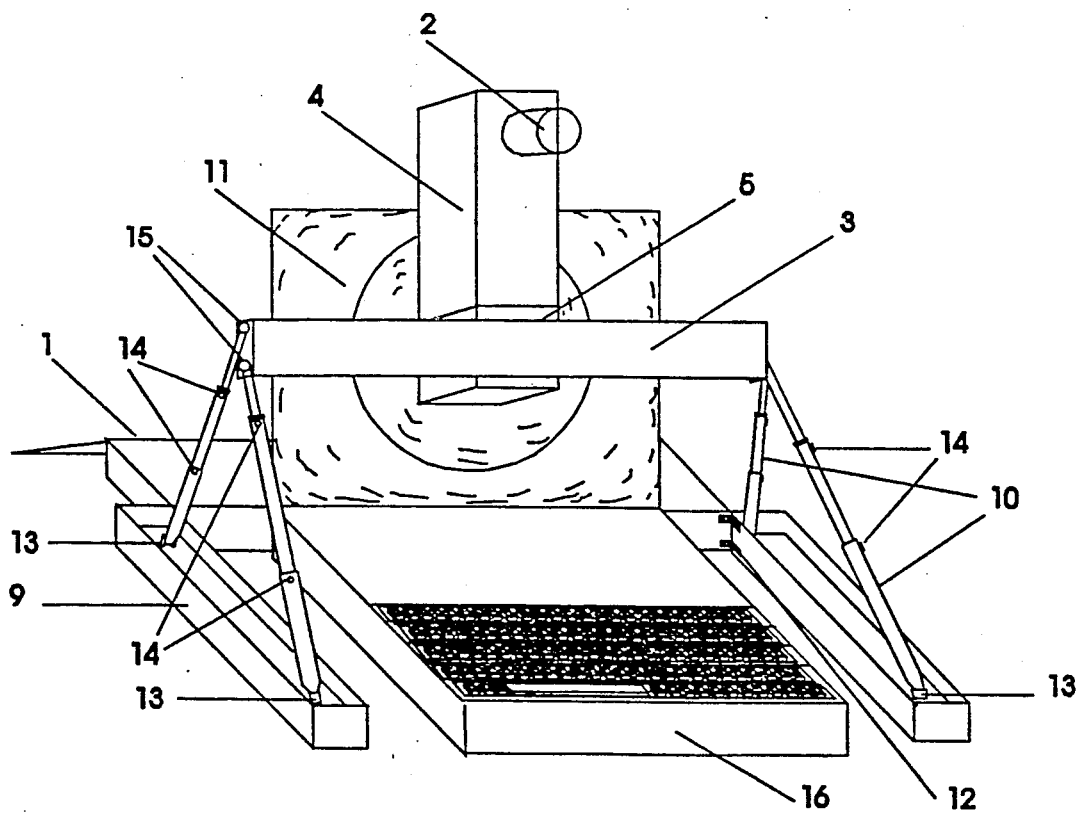
FIG. 2 shows a front view of the unit installed over the computer screen to project an image in back of the keyboard user.

In FIG. 2 we show the unit installed in an in-use position over computer 16. The unit is assembled as follows:

1) the hinged bases 9 which are attached to case 1 with hinges 12 are opened out and positioned around computer 16;

2) extensible legs 10 which are attached to bases 9 with hinges 13 are positioned and extended to attach to mounting bar 3 with fasteners which may stud bolts and wing nuts 15. Mounting bar 3 which may be light gauge metal is preferably about 4" wide whereby with fasteners 15 positioned as shown the extensible legs 10 may be adjusted to allow positioning mounting bar 3 with a slight tilt to secure the optimum light path from shroud 11 to a projection surface. Set screws 14 which preferably are wing nut type are used to hold extensible legs 10 in a desired fixed position;

3) shroud 11 is installed so as to enclose a light path from the face of the computer screen to the inlet of the lower section of the optical projection system 5. In this section of the projector system, the image from the screen goes through a lens and is projected vertically upward using the normal optical system which would typically be a wide angle lens, a collimating lens and mirror or a wide angle lens and a prism;

4) the upper section of the optical projection system 4, which is sized to set in a stable manner into part 5, is then installed. As shown, lens 2 is oriented to project frontwards over the keyboard of computer 16. However, the sections 4 and 5 forming the complete projector system have square cross sections and the upper section 4 may be oriented to project in any one of four positions or to any of four walls in a room. This is true since the vertical image being projected upward through section 5 may be turned at right angles using an normal optical system such as prism or a mirror positioned at essentially a 45° angle. Section 4 of the optical projector system would contain a light bulb and cooling fan as in the normal projector;

5) Connection to an electrical source of the computer and projector system formed by sections 4 and 5 completes the set-up.

Figure 3:
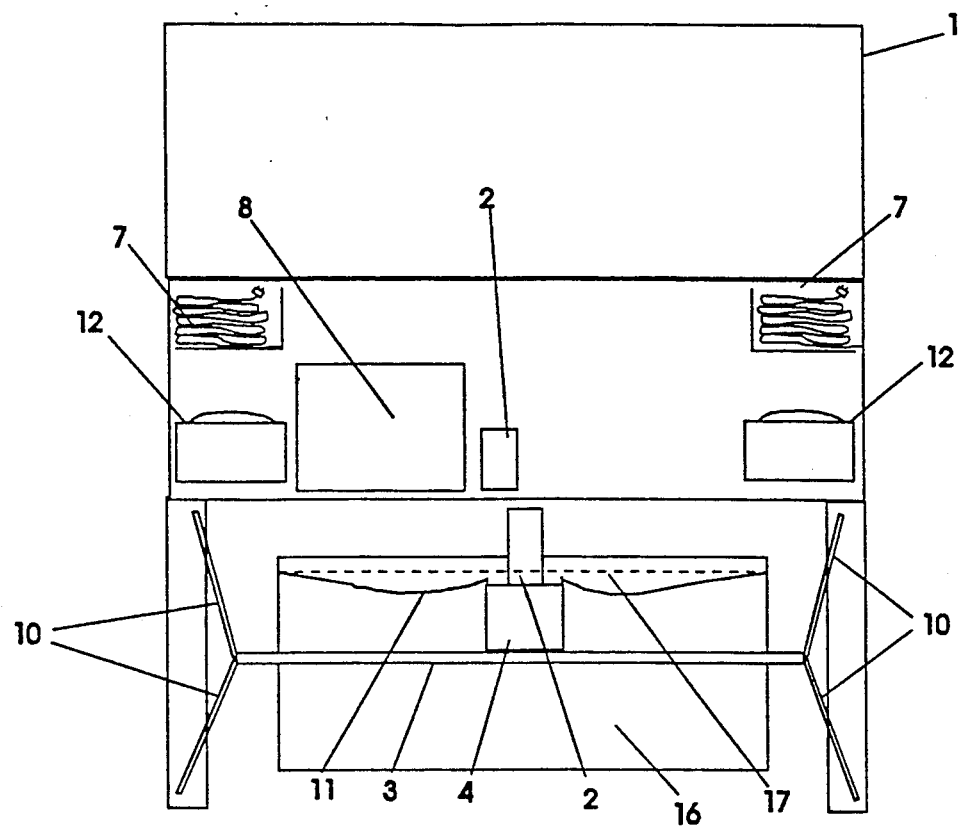
FIG. 3 shows a top view of the unit installed to project an image on the wall in front of the keyboard user.

In FIG. 3 we show a top view of the unit installed over the computer 16 with lens 2 oriented to project away from the computer keyboard thereby allowing the user optimum access to the keyboard. It is visualized that this would be the most desireable position for group presentations. Closure for case 1 is preferable easily detached to save layout space. The shroud 11 covers computer screen 17 and excludes light from the path from the computer screen 17 to the inlet of section 5, FIG. 2, which is just below section 4 of the projection system. The longer lens system 2 is shown installed with the lens system 2 for close projection shown in case 1. These lens systems are designed to slidably fit into section 4.

Figure 4:
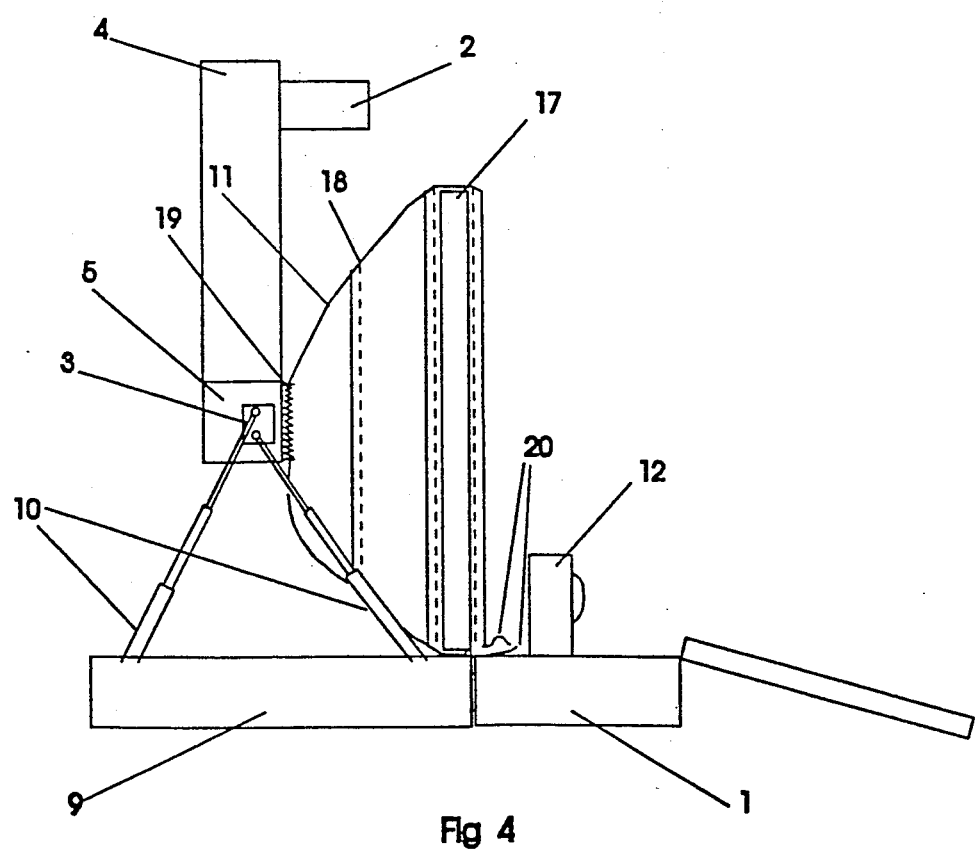
FIG. 4 shows a side view of the shroud and expander ring for the shroud.

In FIG. 4 we show a side view of the unit in an in-use position. Shroud 11 is preferably made to be conductive to shield the user from electromagnetic waves. In one embodiment, the shroud 11 is fabricated from a double layer of black cloth with a very thin aluminum screen wire sewn between, with the aluminum wire grounded to the section 5. Any of several ways of fastening shroud 11 to essentially exclude external light may be used. In a preferred embodiment, an elastic strip is sewn in the opening end 19 to form an elastic closure so that the opening end is simply slipped over a circular projection in section 5. In order to keep the light path clear an expander ring 18 is sewn in an approximate position as shown. Dual elastic strips are sewn in close to the large end of the shroud 11 to cause the material to tend to pull together in front of computer screen 17 and to allow securing the shroud firmly using tie strips 20, that preferably are Velcro TM strips attached to the sewn-in elastic strip.

Figure 5:
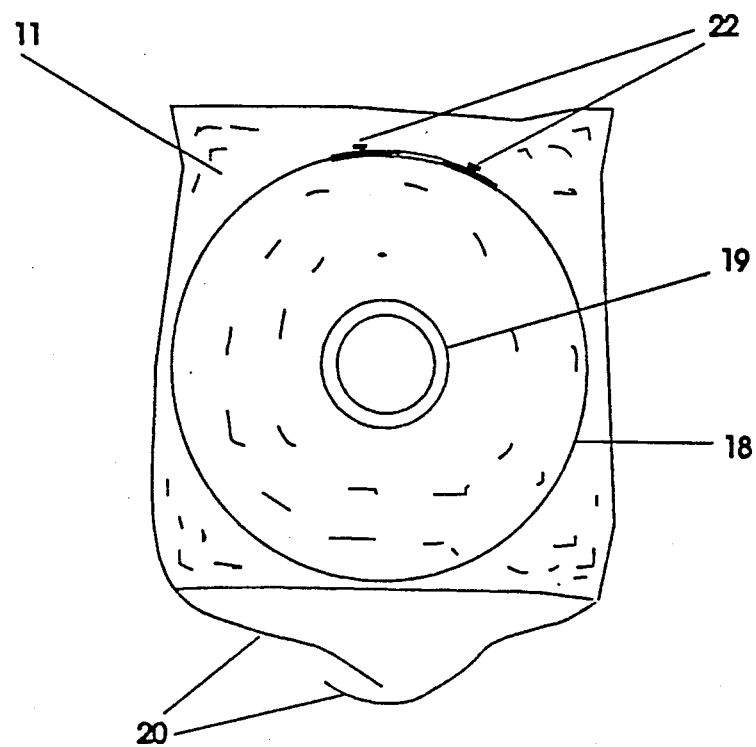
FIG. 5 shows a back view of the shroud indicating some detail of the expander ring.

In FIG. 5 we show a front view of shroud 11 indicating opening end 19 with a sewn in elastic strip to form an elastic, stretchable closure and an adjustable expander ring 18 which is shown to be adjustable using set screws 22 through a curved pipe. Any of many ways to install such an expander ring would be equally usable. Tie strips 20 indicate an elastic strip sewn in the larger end of the shroud 11 and are used as described.

Figure 6:
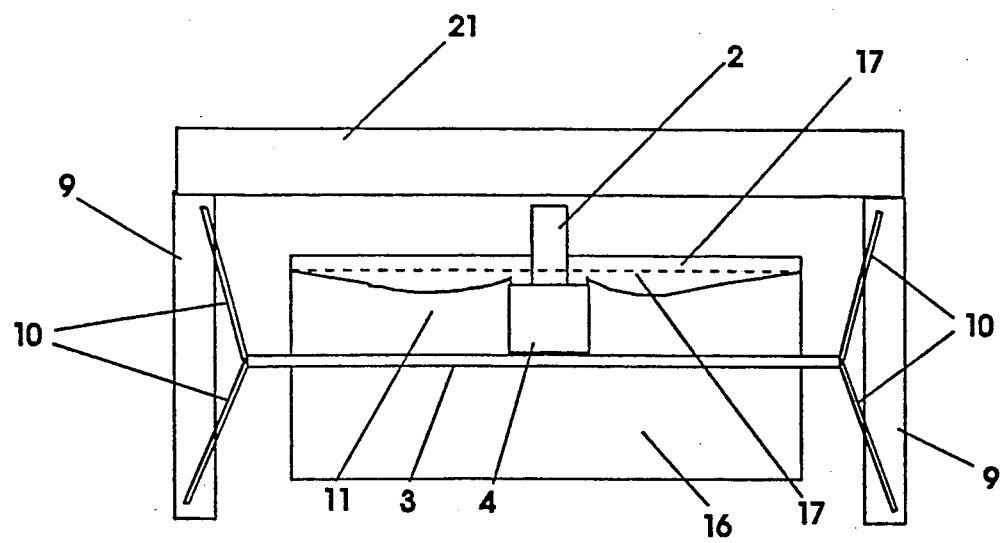
FIG. 6 shows a top view of an embodiment with the mounting frame separate from the carrying case.

In FIG. 6 we show an embodiment of the unit wherein a connecting bar 21 is used to connect to bases 9. This bar 21 may either be hinged or solidly connected to bars 9 but a hinged version is preferred. This embodiment is preferred where the unit is routinely used and a carrying case 1 is not only unnecessary, but would take up desireable desk space.

Figure 7:
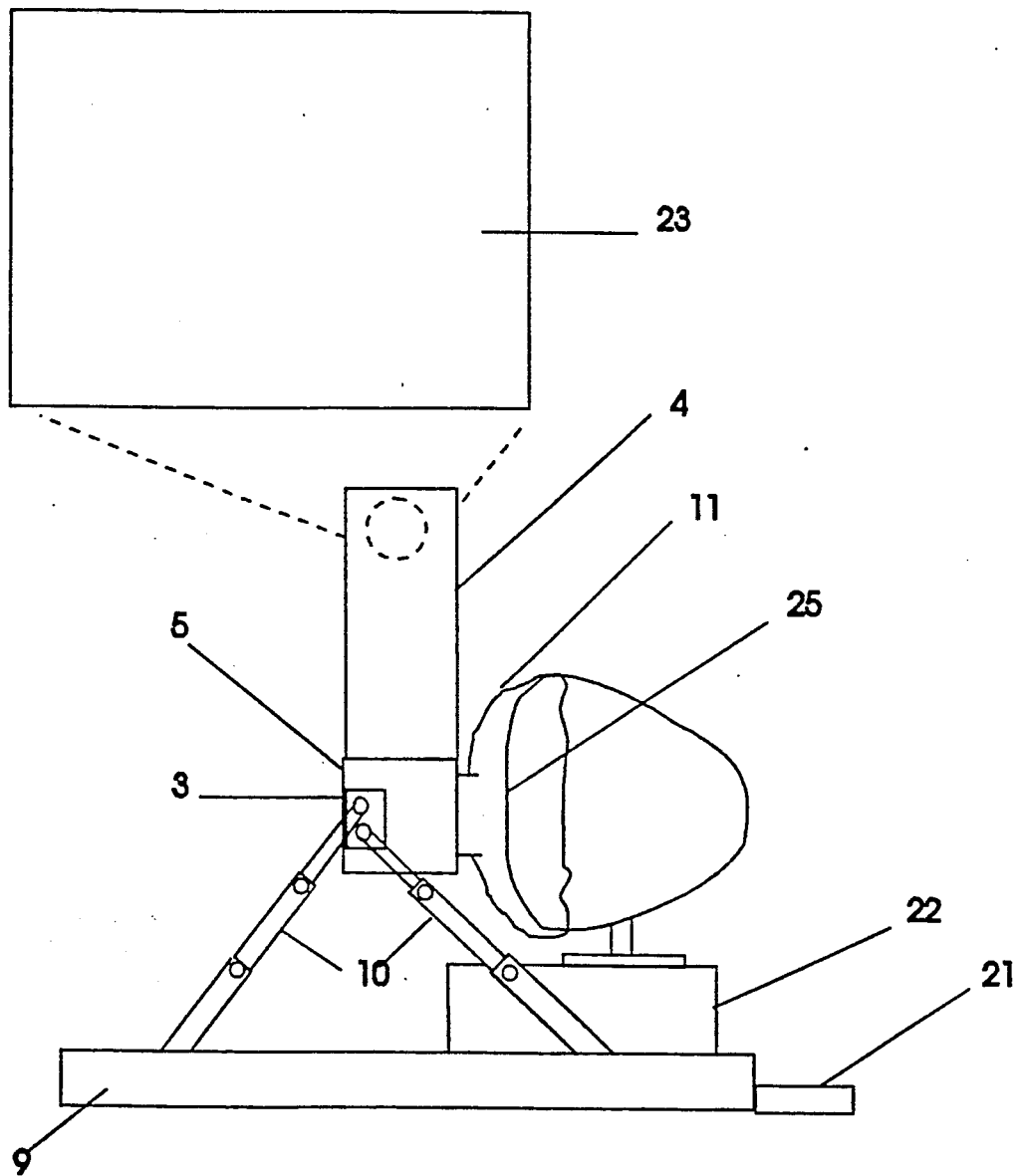
FIG. 7 shows a side view of an embodiment to be used with a desk top computer to project an enlarged computer screen image on a wall at right angles to the face of the computer screen.

In FIG. 7 we show a side view of the unit installed with the shroud 11 covering a light path from CRT screen face 25 to section 5 of a projection system with upper section 4 of the optical projection system turned to project an image 23 of the screen face 25 on the wall at essentially a right angle to computer screen face 25. The user may adjust the size of image 23 to be most comfortable for his use.

In FIG. 7 we show an embodiment primarily meant to be used with a desk top computer where the user may spend extended periods of time in front of the computer screen. In this embodiment, the image from the computer screen 25 is projected on a vertical surface such as a wall 23 at right angles to the computer screen 25. Of course, the image may be enlarged to be most comfortable for the user. Shroud 25, which is preferably conductive to neutralize electromagnetic radiation, encloses a light from screen 25 to the inlet of a lower section 5 of the projection system. The lower section 5 which supports the upper section 4 of the projection system is mounted on mounting bar 3 which is adjustably positioned using extensible legs 10 which are hingedly attached in bases 9. Support bases 9 may be hingedly attached or rigidly attached to a weighted brace bar 21.

What is claimed is:

1. A portable interactive multimedia presentation unit comprising:
 a) a computer;
 b) a projector means to project an image from an essentially vertical backlighted screen of said computer to a vertical surface, said projector means comprising:
 1) a lower section with optics to project said image vertically;
 2) an upper section with a square cross section machined to fit closely into a top part of said lower section with optical means aligned with optics in said lower section with said optical means allowing said upper section to be fitted onto said lower section to project said vertical image received from said lower section at right angles thereby allowing said image to be projected on any of four walls of a room wherein said computer with said multimedia presentation unit is being used;

d) an adjustable conductive shroud means to enclose a light path from said backlighted screen to an entrance to said projector means.

2. A portable interactive multimedia presentation unit as in claim 1 further comprising a carrying case type means for transporting and setting up said projector means; said carrying case type means further comprising:

a) a storage compartment for a mounting strip rigidly attached to a lower part of an optical system for said projector means, an upper part of an optical system for said projector means, a conductive shroud, an electrical extension cord, a light bulb, and miscellaneous computer accessories;

b) a pair of bases hingedly attached with dual extensible legs hingedly attached in each one of said pair of hinged bases.

3. A portable interactive multimedia presentation unit as in claim 2 wherein said carrying case type means also includes a pair of speakers attached to fold into said case means.

4. A portable interactive multimedia presentation unit comprising:

a) computer with a detachable keyboard and backlighted b) a manually adjustable projector means to project an image in any one of four directions, 90 degrees with said backlighted screen being held in a fixed position;

c) a shroud enclosing a light path from said backlighted screen to an inlet to said projector means;

d) a mounting means to adjustable support said projector means.

5. A portable interactive multimedia presentation unit as in claim 4 wherein said shroud is constructed to be conductive and is grounded to a case of said projector means.

6. A portable interactive multimedia presentation unit as in claim 4 wherein said mounting means comprises a U shaped base, cooperating with extensible legs and a mounting bar for said projector means to allow positioning of said projector means.

* * * * *